United States Patent
Jaquette

(10) Patent No.: US 10,785,024 B2
(45) Date of Patent: Sep. 22, 2020

(54) ENCRYPTION KEY STRUCTURE WITHIN BLOCK BASED MEMORY

(71) Applicant: INTERNATIONAL BUSINESS MACHINES CORPORATION, Armonk, NY (US)

(72) Inventor: Glen Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/012,926

(22) Filed: Jun. 20, 2018

(65) Prior Publication Data
US 2019/0394035 A1   Dec. 26, 2019

(51) Int. Cl.
*H04L 9/08* (2006.01)

(52) U.S. Cl.
CPC .......... *H04L 9/0891* (2013.01); *H04L 9/0897* (2013.01)

(58) Field of Classification Search
CPC ............................ H04L 9/0891; H04L 9/0897
USPC .......................................................... 380/277
See application file for complete search history.

(56) References Cited

U.S. PATENT DOCUMENTS

| | | | |
|---|---|---|---|
| 9,183,085 B1 | 11/2015 | Northcott | |
| 9,767,318 B1* | 9/2017 | Dropps | G06F 8/65 |
| 2008/0065906 A1* | 3/2008 | Itagaki | G06F 21/80 |
| | | | 713/193 |
| 2008/0137841 A1* | 6/2008 | Jajodia | H04L 9/0894 |
| | | | 380/28 |
| 2009/0174965 A1* | 7/2009 | Greco | G05D 3/00 |
| | | | 360/92.1 |
| 2010/0325351 A1 | 12/2010 | Bennett | |
| 2011/0060887 A1 | 3/2011 | Thatcher et al. | |
| 2012/0257543 A1* | 10/2012 | Baum | H04W 12/04 |
| | | | 370/255 |
| 2012/0324242 A1* | 12/2012 | Kirsch | H04L 63/08 |
| | | | 713/189 |

(Continued)

FOREIGN PATENT DOCUMENTS

| | | |
|---|---|---|
| EP | 2631916 A1 | 8/2013 |
| WO | 2016107485 A2 | 7/2016 |

OTHER PUBLICATIONS

Park, Seung-Ho, et al., "A mixed flash translation layer structure for SLC-MLC combined flash memory system." Proceedings of the 1th International Workshop on Storage and I/O Virtualization, Performance, Energy, Evaluation and Dependability (SPEED2008). 2008, p. 1.

*Primary Examiner* — Haresh N Patel
(74) *Attorney, Agent, or Firm* — ZIP Group PLLC

(57) ABSTRACT

A data handling system includes a block-based storage device. An encryption key structure block includes key structure locations that may store encryption key structures. A key structure may take on at least three states: an erased state, an active state, and a zeroized state. The key structure includes error control data fields that are configured to contain error control data that independently protect data of the key structure in the active and the zeroized state. Key structures may be stored to key structure locations within a first encryption key block until each key structure location has stored a key structure in the active or zeroized state. Subsequently, the key structures in the active state may be copied and stored in key structure locations within a second encryption key block.

20 Claims, 6 Drawing Sheets

(56) References Cited

U.S. PATENT DOCUMENTS

| | | | |
|---|---|---|---|
| 2013/0086394 A1* | 4/2013 | Shimmitsu | G06F 21/78 713/193 |
| 2013/0111295 A1* | 5/2013 | Li | G06F 11/1064 714/755 |
| 2013/0318423 A1* | 11/2013 | Jagmohan | H03M 13/1515 714/785 |
| 2014/0164876 A1* | 6/2014 | Gasanov | H03M 5/12 714/769 |
| 2015/0154121 A1* | 6/2015 | Schmier | G06F 3/0673 713/193 |
| 2015/0205664 A1 | 7/2015 | Janik et al. | |
| 2015/0363263 A1* | 12/2015 | Hassner | H03M 13/152 714/757 |
| 2017/0185347 A1 | 6/2017 | Flynn et al. | |
| 2017/0286213 A1* | 10/2017 | Li | G11C 16/22 |
| 2018/0054853 A1* | 2/2018 | Rios Almanza | H03M 13/3761 |
| 2018/0115533 A1* | 4/2018 | Wielicki | H04L 63/0435 |
| 2018/0198468 A1* | 7/2018 | Kim | G06F 11/1076 |
| 2019/0108855 A1* | 4/2019 | Higashino | G11B 7/007 |
| 2019/0132133 A1* | 5/2019 | Druker | G06F 21/6218 |
| 2019/0268148 A1* | 8/2019 | Sun | H04L 9/088 |

* cited by examiner

| State | Metadata fields (M) | Key Material (K) | EC Data A (A) | EC Data B (B) | Comment |
|---|---|---|---|---|---|
| Erased | all '1's | all '1's | all '1's | all '1's | only true Erased State |
| Active - option 1 | set per Active State | Active Encryption Key | calc. over M & K | all '1's | A protects Active M & K |
| Active - option 2 | set per Active State | Active Encryption Key | calc. over M & K & B | all '1's | extension of option 1 |
| Active - option 3 | set per Active State | Active Encryption Key | all '1's | calc. over M & K | B protects Active M & K |
| Active - option 4 | set per Active State | Active Encryption Key | all '1's | calc. over M & K & A | extension of option 3 |
| Active - option 5 | set per Active State | Active Encryption Key | calc. over M & K | calc. over M & K in Zeroized State | A protects Active M & K, diff B |
| Active - option 6 | set per Active State | Active Encryption Key | calc. over M & K & B | calc. over M & K & A in Zeroized State | extension of option 5 |
| Active - option 7 | set per Active State | Active Encryption Key | calc. over M & K in Zeroized State | calc. over M & K | B protects Active M & K, diff A |
| Active - option 8 | set per Active State | Active Encryption Key | calc. over M & K & B in Zeroized State | calc. over M & K & A | extension of option 7 |
| Zeroized - option 9 | set per Zeroized State | Zeroized Encryption Key | optionally Zeroized | calc. over M & K in Zeroized State | B protects Zeroized M & K |
| Zeroized - option 10 | set per Zeroized State | Zeroized Encryption Key | optionally Zeroized | calc. over M & K & A in Zeroized State | extension of option 9 |
| Zeroized - option 11 | set per Zeroized State | Zeroized Encryption Key | calc. over M & K in Zeroized State | optionally Zeroized | A protects Zeroized M & K |
| Zeroized - option 12 | set per Zeroized State | Zeroized Encryption Key | calc. over M & K & B in Zeroized State | optionally Zeroized | extension of option 11 |

FIG. 11

ENCRYPTION KEY STRUCTURE WITHIN BLOCK BASED MEMORY

FIELD OF THE INVENTION

Embodiments of the invention generally relate to data handling systems and more particularly relate to block-based memory and storing and maintaining an encryption key structure therein.

DESCRIPTION OF THE RELATED ART

Encryption key structures, which may also be referred to as key structures, are data structures that contain encryption keys. When many encryption keys are stored within an array of key structures there may be a need to modify one encryption key independently from the other encryption keys.

Known key structures that are stored within memory in which data may be written and erased on byte boundaries, such as static random-access memory (SRAM), dynamic random-access memory (DRAM), non-volatile random-access memory, magnetoresistive random-access memory (MRAM), or the like, may not work well in block-based memories where a block is the minimum size of data that may be erased (i.e. all bits are set to "1" within the block). In traditional block-based memories, to perform an initial write of an encryption key within a key structure, the key structure is written to directly to the memory area such that selective bits of the key structure are set to "0" from the previous "1." When one encryption key needs to be modified, the modification cannot be performed in place, unless all the bits in the same block are set all to "1" again, which is an operation termed "erase." So, to modify one encryption key, a memory controller may have to read an entire block, erase the block, and write all of the data, including the modified encryption key, back to the block.

For example, a block may be sixty-four kilobytes long and an individual key structure may be sixty-four bytes long. So, in traditional block-based memories, sixty-four kilobytes or a maximum of 1024 possible key structures are inefficiently erased in order to modify one sixty-four byte key structure.

Further, in write limited block-based memories, such as flash memory, an error rate typically climbs as a function of the number of erase and modify cycles performed. Depending on the exact technology used, the error rate might grow to an unacceptable level upon, for example, upon reaching two thousand cycles. Therefore, if the error rate of a block of write limited block-based memory becomes unacceptably high in P number erase cycles, and if every encryption key modification requires that a block of memory be erased, effectively only P number encryption key modifications can be performed associated with that block.

A non-zero error rate may be tolerated if there is sufficient redundancy in the form of error control data, such as error-correction code (ECC), cyclic redundancy checks (CRCs), or the like. Because error control data is stored in addition to the data that is stored, the greater the error control data that is stored, the higher the percentage of storage used for error control data means the lower the percentage of storage used for data. The higher the error rate that is tolerated, the higher the percentage of data stored is error control data to allow errors to be identified and/or corrected.

SUMMARY

In an embodiment of the present invention, a computer program product for changing a state of a first encryption key structure within a first location of a block-based storage is presented. The computer program product includes a computer readable storage medium having program instructions embodied therewith. The program instructions are readable to cause a processor to change the state of the first encryption key structure from an erased state to an active state by storing a first active encryption key within an encryption key field of the encryption key structure and storing first error correction code that protects the first active encryption key within a first control data field of the encryption key structure. The program instructions are readable to cause the processor to change the state of the first encryption key structure from the active state to a zeroized state by setting non-zero bits of the first active encryption key to zero within the encryption key field to create a zeroized encryption key, by setting zero or more non-zero bits of the first error correction code to zero within the first control data field to create zeroized first error correction code, and storing second error correction code that protects the zeroized encryption key and the zeroized first error correction code within a second control data field of the first encryption key structure.

In another embodiment of the present invention, a data handling system includes a processor communicatively connected to a memory that comprises program instructions. The program instructions are readable by the processor to cause the processor to change a state of a first encryption key structure within a first location of a block-based storage, communicatively connected to the processor, from an erased state to an active state by storing a first active encryption key within an encryption key field of the encryption key structure and by storing first error correction code that protects the first active encryption key within a first control data field of the encryption key structure. The program instructions are readable by the processor to further cause the processor to change the state of the first encryption key structure from the active state to a zeroized state by setting non-zero bits of the first active encryption key to zero within the encryption key field to create a zeroized encryption key, by setting one or more non-zero bits of the first error correction code to zero within the first control data field to create zeroized first error correction code, and storing second error correction code that protects the zeroized encryption key and the zeroized first error correction code within a second control data field of the first encryption key structure.

In yet another embodiment of the present invention, a computer program product for managing a state of a first encryption key structure within a first location of a block-based storage is presented. The computer program product includes a computer readable storage medium having program instructions embodied therewith. The program instructions are readable to cause a processor to store a first active encryption key within an encryption key field of the encryption key structure and store first error correction code that protects the first active encryption key within a first control data field of the encryption key structure. The program instructions are readable to further cause a processor to determine which one or more one bits of the first error correction code are set to zero, thereby forming zeroized first error correction code, upon a state of the encryption key structure changing from an active state to a zeroized state. The program instructions are readable to further cause a processor to, prior to the state of the encryption key structure changing from the active state to the zeroized state, store second error correction code that protects a zeroized encryption key and protects the zeroized first error correction code within a second control data field of the first encryption key structure.

These and other embodiments, features, aspects, and advantages will become better understood with reference to the following description, appended claims, and accompanying drawings.

BRIEF DESCRIPTION OF THE DRAWINGS

FIG. 11 is a table that illustrates various contents and functions of data within encryption key structure, according to various embodiments of the invention.

DETAILED DESCRIPTION

A data handling system includes a block-based storage device. An encryption key structure block includes key structure locations that may store encryption key structures. A key structure may take on at least three states: an erased state, an active state, and a zeroized state. The key structure includes error control data fields that are configured to contain error control data that independently protect data of the key structure in the active and the zeroized state. Key structures may be stored to key structure locations within a first encryption key block until each key structure location has stored a key structure in the active or zeroized state. Subsequently, the key structures in the active state may be copied and stored in key structure locations within a second encryption key block.

Figure 1:
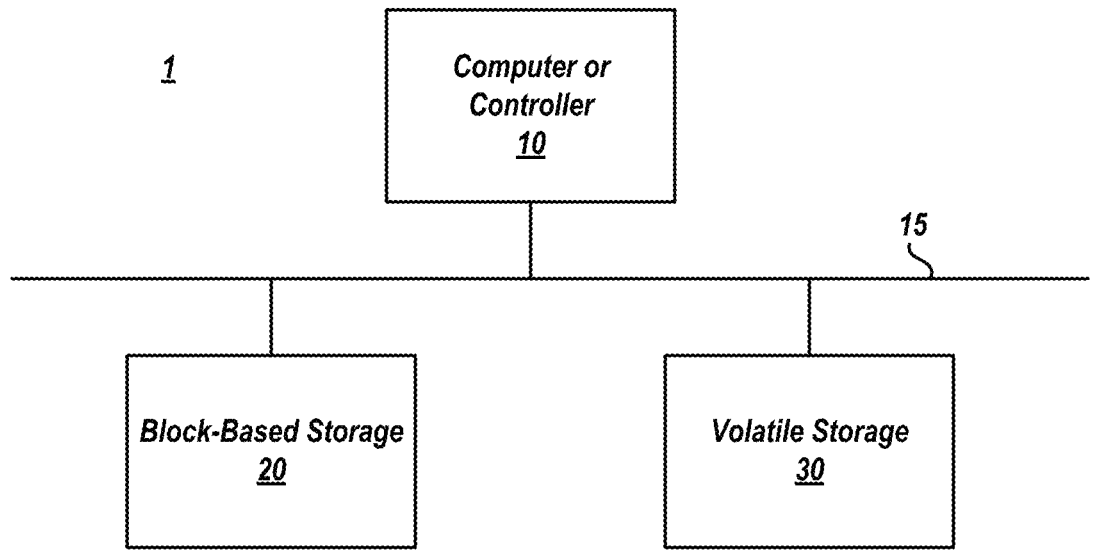
FIG. 1 illustrates a data handling system having volatile and non-volatile block storage, according to various embodiments of the invention.

Referring to the Drawings, wherein like numbers denote like parts throughout the several views, FIG. 1 illustrates a data handling system 1 that has a volatile storage 30 and non-volatile storage 20. Non-volatile 30 storage is a block based non-volatile storage device such as a magnetic tape, solid state memory, rotating media such as floppy disks, hard disks, and optical discs. In a particular embodiment, non-volatile 30 storage is a flash memory which may include multiple flash chips. Volatile memory 20 is a volatile memory device such as SRAM, DRAM, or the like. Data handling system 1 may also include a computer or controller 10, which may be referred to herein simply as a processor, which may be a computer, processor, microprocessor, memory controller, field-programmable-gate-array (FPGA), state machine or the like, which itself may include local memory, which may include volatile and non-volatile memory, including memory for local storage of program instructions which may be for example, an operating system, application, or the like. Alternatively, such program instructions may be loaded from another memory connected to controller 10 by a data bus 15 which may be connected to a network. Upon the processor evoking the program instructions, the processor becomes a particular machine configured to carry out functionality of the program instructions. The controller 10 may also include circuitry for interfacing with the data bus 15 or have another form of interface to the remainder of the system 1.

The present invention may be a system, a method, and/or a computer program product. The computer program product may include a computer readable storage medium (or media) having computer readable program instructions thereon for causing the processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
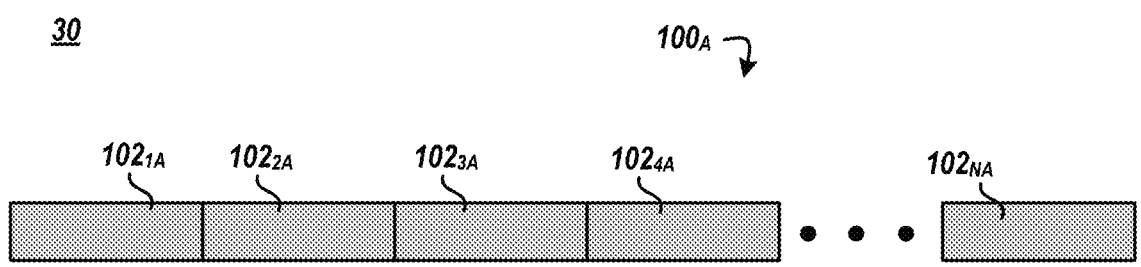
FIG. 2 illustrates an exemplary encryption key block that includes key structure locations, according to various embodiments of the invention.

FIG. 2 illustrates an exemplary encryption key block $100_A$ that includes key structure locations $102_{1A}$, $102_{2A}$, $102_{3A}$, $102_{4A}$, and $102_{NA}$ within non-volatile 30. Though one encryption key block $100_A$ is depicted within non-volatile 30, non-volatile 30 may include additional encryption key blocks $100_B$, $100_C$, $100_D$, etc. A generic encryption key block, as opposed to a particular encryption key block $100_A$, $100_B$, $100_C$, $100_D$, may be referred to herein as encryption key block 100. Likewise, one or more key structure locations within encryption key block 100 may be referred to herein as key structure location(s) 102.

Encryption key block 100 is a block and therefore is the minimum size storage 30 that may be erased. Encryption key block 100 includes one or more storage circuits that, collectively, are operable to store a block of data. Encryption key block 100 includes key structure locations 102 which collectively include the one or more storage circuits. Key structure locations 102 may be the same size (e.g. the same number of storage circuits, etc.) and therefore may store the same or substantially similar amount of data or may be different size(s) and therefore may store dissimilar amount of data. In a preferred embodiment, key structure locations 102 are the same size and are configured to store the same amount of data, though the amount of data stored in different key structure locations 102 may be different.

Each key structure location 102 is configured to store one encryption key structure. To perform an initial write to encryption key block 100, one encryption key structure is written to one key structure location 102 such that selective bits of the key structure within the key structure location 102 are set to "0" from the previous "1."

Figure 3:
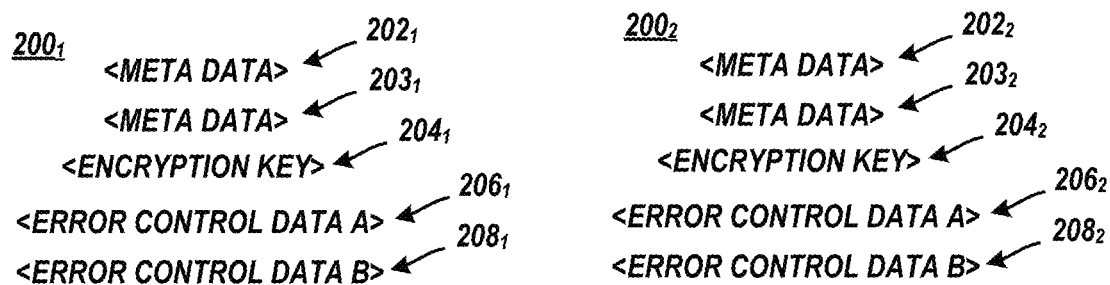
FIG. 3 illustrates an exemplary encryption key structure, according to various embodiments of the invention.

FIG. 3 illustrates exemplary encryption key structures $200_1$ and $200_2$, according to various embodiments of the invention. A generic encryption key structure, as opposed to a particular encryption key structures $200_1$, $200_2$, etc. may be referred to herein as encryption key structure 200. Encryption key structures 200 are data structures that may take on three or more valid states, with each state increasing the amount of "0" bits within the data structure, without moving the encryption key structure 200 from its associated key structure location 102. Encryption key structures 200 increase utilization of encryption key block 100 within block-based storage 30. In write limited storage 30, encryption key block 100 may be utilized until an unacceptably high error rate is reached.

Encryption key structure 200 includes an encryption key field that is configured to contain an active encryption key and includes multiple error control fields that are configured to contain error control data that protects the data within the encryption key structure in different states. In some embodiments, encryption key structure 200 may also contain one or more metadata fields that are configured to contain metadata associated with the data within the encryption key structure in different states.

As is exemplarily depicted, encryption key structure $200_1$ includes metadata field $202_1$ that is configured to contain metadata associated with data within the encryption key structure $200_1$ and is written to encryption key structure $200_1$ when encryption key structure $200_1$ is transitioned from the erased state to the active state. The metadata in metadata field $202_1$ may be zeroized by setting zero or more "1" bits to "0" bits when the encryption key structure $200_1$ is transitioned from the active state to the zeroized state.

Encryption key structure $200_1$ includes metadata field $203_1$ that is configured to contain metadata associated with data within the encryption key structure $200_1$ and is written to encryption key structure $200_1$ when encryption key structure $200_1$ is transitioned from the active state to a state after the active state. If encryption key structure $200_1$ is configured to have three states, the state after the active state is the zeroized state. If encryption key structure $200_1$ is configured to have more than three states, the state(s) after the active state are post-active state(s) between the active state and the zeroized state. The metadata in metadata field $203_1$ may be zeroized by setting zero or more "1" bits to "0" bits when the encryption key structure $200_1$ is transitioned from the active state.

Further, encryption key encryption key structure $200_1$ includes an encryption key field $204_1$ that is configured to contain an active encryption key when encryption key structure $200_1$ is in the active state and a zeroized encryption key when encryption key structure $200_1$ is in the zeroized state.

Encryption key structure $200_1$ also includes error control A field $206_1$ that is configured to contain error control data that protects at least a subset of the data within the encryption key structure $200_1$. In embodiments, the error control data within error control B field $208_1$ after the transition of structure $200_1$ from the erased state in the active state may be maintained as all "1" bits (i.e. maintained in the erased state) or may be error control data that protects data within the encryption key structure $200_1$ as that data is predicted to exist after the transition of structure $200_1$ from the active state in the zeroized state. The error control data in error control A field $206_1$ may be zeroized by setting zero or more "1" bits to "0" bits when the encryption key structure $200_1$ is transitioned from the active state to the zeroized state.

Encryption key structure $200_1$ also includes error control B field $208_1$ that is configured to contain error control data that protects at least a subset of data within the encryption key structure $200_1$. The error control data in error control B field $208_1$ may be zeroized by setting zero or more "1" bits to "0" bits when the encryption key structure $200_1$ is transitioned to the zeroized state.

Generally, error control A field $206_1$ and error control B field $208_1$ contains data that protects at least a subset of data within the encryption key structure $200_1$ when encryption key structure $200_1$ is in different states. For example, error control A field $206_1$ contains data that protects encryption key structure $200_1$ in the active state and error control A field $206_1$ contains data that protects encryption key structure $200_1$ in the post-active state, such as the zeroized state.

Similarly, encryption key structure $200_2$ includes metadata field $202_2$ that is configured to contain metadata associated with data within the encryption key structure $200_2$ and is written to encryption key structure $200_2$ when encryption key structure $200_2$ is transitioned from the erased state to the active state. The metadata in metadata field $202_2$ may be zeroized by setting zero or more "1" bits to "0" bits when the encryption key structure $200_2$ is transitioned from the active state to the zeroized state.

Encryption key structure $200_2$ includes metadata field $203_2$ that is configured to contain metadata associated with data within the encryption key structure $200_2$ and is written to encryption key structure $200_2$ when encryption key structure $200_2$ is transitioned from the active state to a state after the active state. If encryption key structure $200_2$ is configured to have three states, the state after the active state is the zeroized state. If encryption key structure $200_2$ is configured to have more than three states, the state(s) after the active state are post-active state(s) between the active state and the zeroized state. The metadata in metadata field $203_2$ may be zeroized by setting zero or more "1" bits to "0" bits when the encryption key structure $200_2$ is transitioned to the zeroized state.

Further, encryption key structure $200_2$ includes an encryption key field $204_2$ that is configured to contain an active encryption key when encryption key structure $200_2$ is in the active state and a zeroized encryption key when encryption key structure $200_2$ is in the zeroized state.

Encryption key structure $200_2$ also includes error control A field $206_2$ that is configured to contain error control data that protects at least a subset of data within the encryption key structure $200_2$. In embodiments, the error control data within error control B field $208_2$ after the transition of structure $200_2$ from the erased state in the active state may be maintained as all "1" bits (i.e. maintained in the erased state) or may be error control data that protects data within the encryption key structure $200_2$ as that data is predicted to exist after the transition of structure $200_2$ from the active state in the zeroized state. The error control data in error control A field $206_2$ may be zeroized by setting zero or more "1" bits to "0" bits when the encryption key structure $200_2$ is transitioned from the active state to the zeroized state.

Encryption key structure $200_1$ also includes error control B field $208_2$ that is configured to contain error control data that protects at least a subset of data within the encryption key structure $200_2$. The error control data in error control B field $208_2$ may be zeroized by setting zero or more "1" bits to "0" bits when the encryption key structure $200_2$ is transitioned from the zeroized state to the post-zeroized state.

Generally, error control A field $206_2$ and error control B field $208_2$ contains data that protects at least a subset of data within the encryption key structure $200_2$ when encryption key structure $200_2$ is in different states. For example, error control A field $206_2$ contains data that protects encryption key structure $200_2$ in the active state and error control A field $206_2$ contains data that protects encryption key structure $200_2$ in the post-active state, such as the zeroized state.

A generic metadata field, encryption key field, error control A field, error control B field, or the like, may be referred to herein as metadata field 202, metadata field 203, encryption key field 204, error control A field 206, error control B field, 208, respectively.

Generally, metadata field 202 and metadata field 203 are different metadata fields configured to contain metadata stored to its structure 200 that each applicable to different instances: upon the structure 200 transitioning from the erased state to the active state and from the active state to the zeroized state. Metadata field 202 is configured to contain metadata associated within its structure 200 and is written to encryption key structure 200 when encryption key structure 200 is transitioned from the erased state to the active state. Similarly, metadata field 203 is configured to contain metadata associated within its structure 200 and is written to encryption key structure 200 when encryption key structure 200 is transitioned from the active state to a post-active state, such as the zeroized state.

Generally, error control data field 206 and error control data field 208 are different fields configured to contain control data stored to its structure 200 at different instances: upon the structure 200 transitioning from the erased state to the active state and upon the transition from the active state to the post-active state, such as the zeroized state.

Different options of the function and/or definition of the data within fields 202,203; 204, 206; and 208 of encryption key structure 200 in the erased state, active state, and zeroed state is depicted in a table in FIG. 11.

Encryption key structure 200 is configured to take on three or more valid states: erased, active, and zeroized without moving the encryption key structure 200 from its associated key structure location 102. Generally, encryption key structure 200 changes states when encryption key structure 200 is modified such that one or more "1" bits within the encryption key structure 200 are set to "0."

The term "erased state," or the like, is defined herein to be the state of key structure 200 when all or nominally all the bits of the key structure 200 stored within a storage location 102 of encryption key block 100 are erased, or in other words, set to "1." Erased state may be an initial state of a key structure 200. The term "nominally all the bits are erased," or the like, is herein defined to be bits that were configured to be erased though, because an acceptable error rate, a subset of such bits are not erased.

The term "active state," or the like, is defined herein to be the state of key structure 200 when the encryption key within encryption key field 204 is an active key and error control data is valid data that protects the data within key structure 200 as that data exists after the transition from erased state in the active state. Active state sequentially follows erased state (e.g. structure 200 contains fewer "1" bits in the active state than when in the erased state). The term "active encryption key" or the like is defined herein to be an encryption key or is data from which the encryption key can be determined, that can specify transformation, by a decryption application, of unencrypted data into encrypted data, and vice versa. For example, the active encryption key can be an encryption key in cleartext form, an encryption key in encrypted form, a wrapped encryption key, a root encryption key, a wrapped root encryption key, or the like.

The term "zeroized state," or the like, is defined herein to be the state of key structure 200 when the encryption key within encryption key field 204 is a zeroized encryption key, at least zero or more of the "1" bits of error control data are set to "0," at least zero or more of the "1" bits of metadata are set to "0," and the other error control data is valid data that protects the data within key structure 200 as that data exists after the transition to the zeroized state. For example, error control data within error control B field 208 protects the zeroized encryption key within encryption key field 204, new metadata within metadata field 203 (if any), the zeroized metadata within metadata field 202 (if any), and the zeroized error control data within error control A field 206. Zeroized state subsequently follows active state (e.g. structure 200 contains all the zeroed bits of structure 200 when in the active state plus additional zeroed bits).

The term "zeroized encryption key," or the like, is defined herein to be an encryption key that was previously an active encryption key, but because of a majority, nominally all, or all the "1" bits of the active encryption key being set to "0," can no longer specify transformation, by the decryption application, of the unencrypted data into the encrypted data, and vice versa.

The term "zeroized error control data," or the like, is defined herein to be error control data that was previously in the active state in which zero or more of the "1" bits were set to "0."

The term "zeroized metadata data," or the like, is defined herein to be metadata that was previously in the active state in which zero or more of the "1" bits were set to "0."

Figure 4:
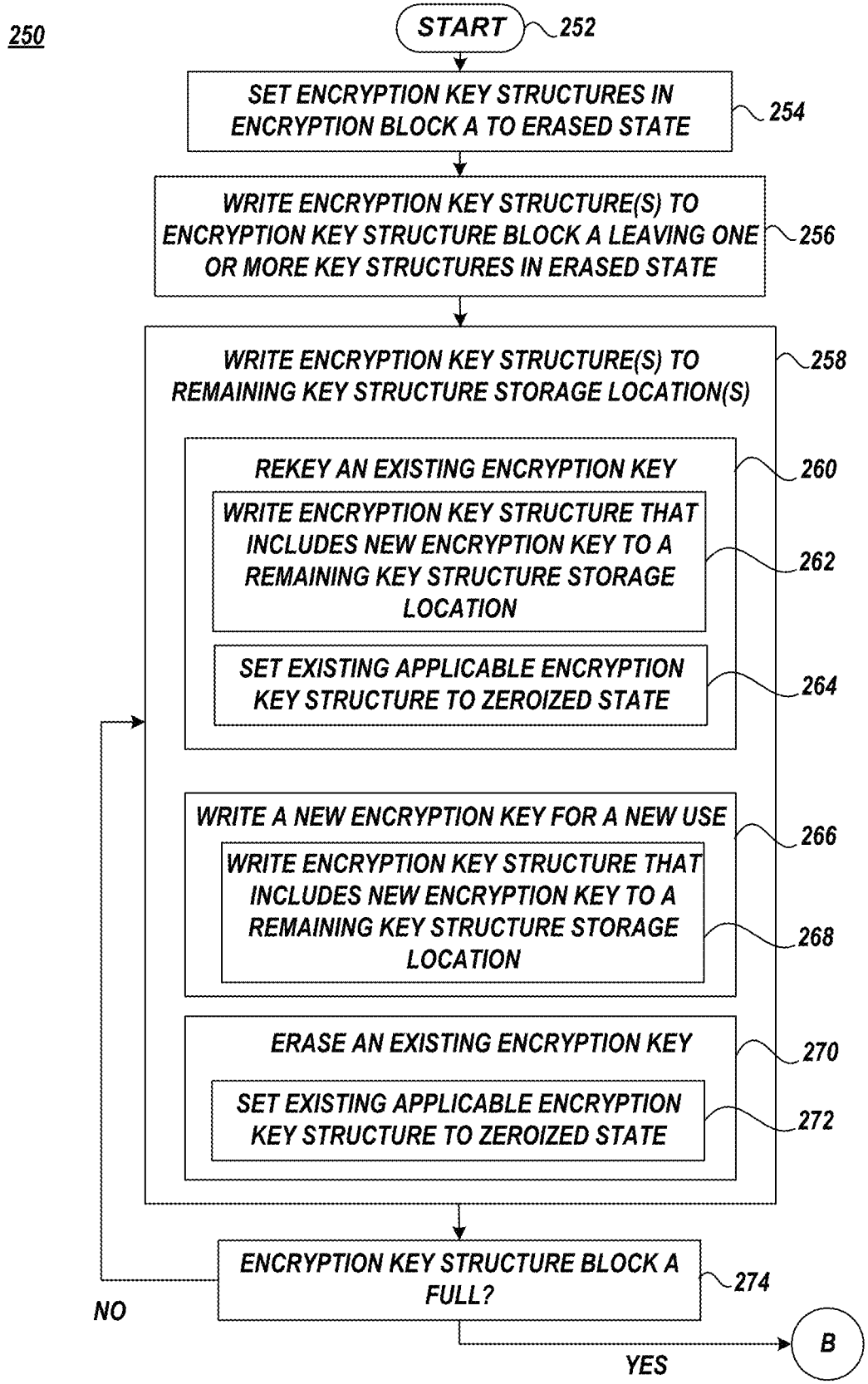
FIG. 4 and FIG. 5 illustrates an exemplary method of managing states of encryption key structures within encryption key blocks, according to various embodiments of the invention.
Figure 5:
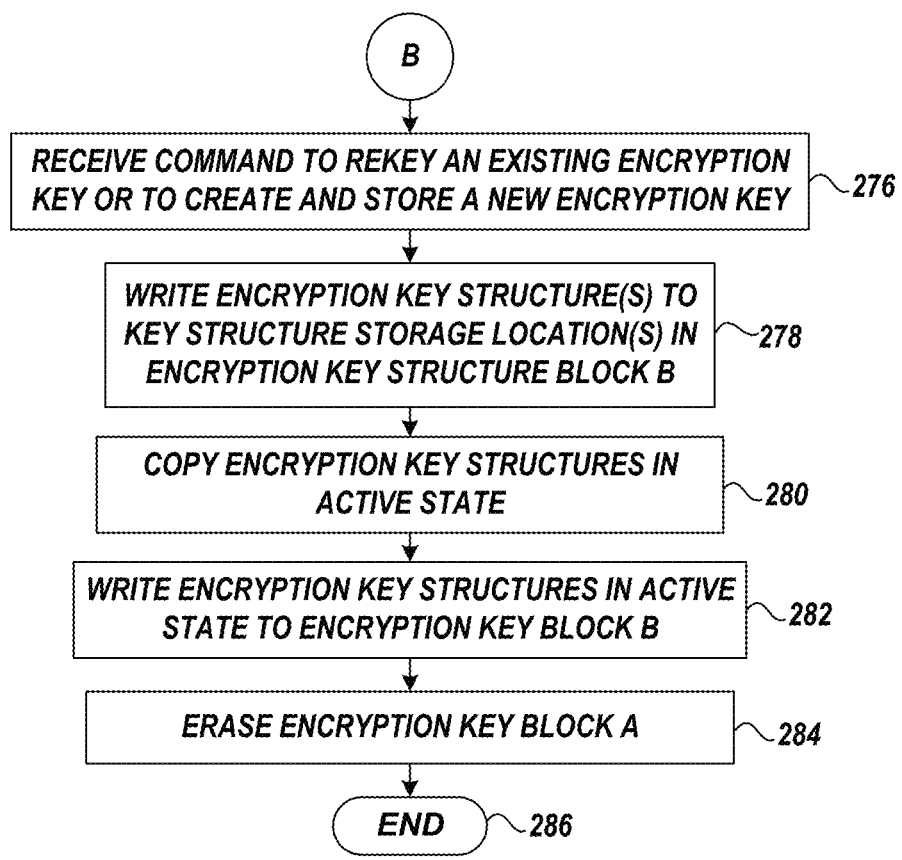

FIG. 4 and FIG. 5 illustrates an exemplary method 250 of managing states of encryption key structures $200_1$-$200_N$ within encryption key blocks $100_A$ and $100_B$, according to various embodiments of the invention. The functionality of method 250 may be embodied by program instructions that may be evoked by the processor to cause the processor to carry out such functionality. Method 250 begins at block 252 and may continue with setting the encryption key structures 200 within encryption key blocks $100_A$ and $100_B$ to the erased state (block 254).

Method 250 may continue writing encryption structure data to one or more encryption key structure(s) 200 within encryption key location(s) 102 leaving one or more structures 200 in encryption key location(s) 102 in the erased state (block 256). For example, an encryption application encrypts first data with a first active encryption key and stores such first active encryption key within field $204_1$ of key structure $200_1$ that is stored within location $102_{1A}$. Metadata associated with the first active encryption key may be stored to field $202_1$ of key structure $200_1$. Data in field $208_1$ may be maintained in the erased state or may be valid data that is stored to field $208_1$ that protects the data within key structure $200_1$ as that data is anticipated to exist in the zeroized state. Error control data that protects the data within key structure $200_1$ as it exists in the active state may be written to field $206_1$.

Subsequently, the encryption application encrypts second data with a second active encryption key and stores such second active encryption key within field $204_2$ of key structure $200_2$ that is stored within location $102_{2A}$. Metadata associated with the second active encryption key may be stored to field $202_2$ of key structure $200_2$. Data in field $208_2$ may be maintained in the erased state or may be valid data that is stored to field $208_2$ that protects the data within key structure $200_2$ as that data is anticipated to exist in the zeroized state. Error control data that protects the key structure $200_2$ as that data exists in the active state may be written to field $206_2$.

Subsequently, the encryption application encrypts third data with a third active encryption key and stores such third active encryption key within field $204_3$ of key structure $200_3$ that is stored within location $102_{3A}$. Metadata associated with the third active encryption key may be stored to field $202_3$ of key structure $200_3$. Data in field $208_3$ may be maintained in the erased state or may be valid data that is stored to field $208_3$ that protects the data within key structure $200_3$ as that data is anticipated to exist in the zeroized state. Error control data that protects key structure $200_3$ as that data exits in the active state may be written to field $206_3$.

Subsequently, the encryption application encrypts fourth data with a fourth active encryption key and stores such fourth active encryption key within field $204_4$ of key structure $200_4$ that is stored within location $102_{4A}$. Metadata associated with the fourth active encryption key may be stored to field $202_4$ of key structure $200_4$. Data in field $208_4$ may be maintained in the erased state or may be valid data that is stored to field $208_4$ that protects the data within key structure $200_4$ as that data is anticipated to exist in the zeroized state. Error control data that protects key structure $200_4$ as that data exits in the active state may be written to field $206_4$. At least one key structure $200_N$ that is stored within location $102_{NA}$ remains in the erased state.

Method 250 may continue with writing encryption key data to one or more encryption key structure(s) 200 within remaining encryption key location(s) 102 (block 258).

In one option, an existing active encryption key may be rekeyed (block 260). For example, the fourth encryption key is rekeyed by the encryption application thereby generating a fifth active encryption key. The new fifth active encryption key is written to a key structure 200 within a remaining location 102 that is in the erased state, and such key structure 200 state is changed from erased to active (block 262). For example, the encryption application writes the fifth encryption key to field $204_N$ key structure $200_N$ that is within location $102_{NA}$. Metadata associated with the fifth active encryption key may be stored to field $202_3$ of key structure $200_N$. Data in field $208_N$ may be maintained in the erased state or may be valid data that is stored to field $208_N$ that protects the data within key structure $200_N$ as that data is anticipated to exist in the zeroized state. Error control data that protects key structure $200_N$ as that data exits in the active state may be written to field $206_N$ of key structure $200_N$.

The encryption structure that contains the existing active encryption key, associated with the rekeying operation, is the changed from the active state to the zeroized state (block 264). For example, the encryption application sets the state of key structure $200_4$ within location $102_{4A}$ to zero by zeroizing the fourth encryption key by setting at least the majority of all of the "1" bits of the fourth encryption key within field $204_4$ to "0," setting at least zero or more of the "1" bits of error control data within error control A field $206_4$ to "0," setting zero or more of the "1" bits of metadata within metadata field $202_4$ (if any) to "0," and writing error control data to error control B field $208_4$ that protects the now zeroized encryption key within encryption key field $204_4$, any new metadata (e.g. a pointer to location $102_{NA}$, or the like) written to metadata field $203_4$ (if any), the newly zeroized metadata within metadata field $202_4$ (if any), and the newly zeroized error control data within error control A field $206_4$.

In another option, encryption structure data is written to the encryption key structure(s) 200 within the remaining encryption key location(s) 102 (block 266). For example, a new encryption key is used to encrypt new data by the encryption application and associated encryption key data is written to key structure 200 within a remaining location 102 that is in the erased state, thereby changing the state of that key structure 200 from erased to active (block 268). For example, the encryption application encrypts new data with a sixth active encryption key and stores such sixth active encryption key within field $204_N$ of key structure $200_N$ within location $102_{NA}$. Metadata associated with the sixth active encryption key may be stored to field $202_N$ of key structure $200_N$. Data in field $208_N$ may be maintained in the erased state or may be valid data that is stored to field $208_N$ that protects the data within key structure $200_N$ as that data is anticipated to exist in the zeroized state. Error control data that protects the sixth active encryption key and metadata in field $202_N$ (if any) may be written to field $206_N$.

In yet another option, an existing active encryption key is zeroized without being rekeyed (block 270). For example, the fourth encryption key is zeroized by the encryption application. The encryption structure that contains the existing active encryption key is changed from the active state to the zeroized state (block 272). For example, the encryption application sets the state of key structure $200_4$ within location $102_{4A}$ to zero by zeroizing the fourth encryption key by setting at least the majority of all of the "1" bits of the fourth encryption key within field $204_4$ to "0," setting at least zero or more of the "1" bits of error control data within error control A field $206_4$ to "0," setting zero or more of the "1" bits of metadata within metadata field $202_4$ (if any) to "0," and writing error control data to error control B field $208_4$ that protects the now zeroized encryption key within encryption key field $204_4$, the newly zeroized metadata within metadata field $202_4$ (if any), and the newly zeroized error control data within error control A field $206_4$.

Method 250 may continue with determining whether the encryption key block $100_A$ is full (block 274). For example, the encryption application may determine if each key structure 200 within structure locations $102_{1A}$, $102_{2A}$, $102_{3A}$, $102_{4A}$, and $102_{NA}$, respectively are no longer in the erased state. If there is a key structure 200 within structure locations $102_{1A}$, $102_{2A}$, $102_{3A}$, $102_{4A}$, and $102_{NA}$ in the erased state the encryption key block $100_A$ is not full and method 250 returns to block 258.

If all of the key structures 200 within structure locations $102_{1A}$, $102_{2A}$, $102_{3A}$, $102_{4A}$, and $102_{NA}$ are no longer in the erased state, the encryption key block $100_A$ is full and method 250 proceeds to block 276 where an existing active encryption key is rekeyed or new encryption key data is written to a key structure within key block $100_B$. For example, the third encryption key is rekeyed by the encryption application decrypting the third data with the third active encryption key and re-encrypting the third data with a seventh encryption key. The new or seventh encryption key is written to a key structure 200 within a location 102 in the erased state within key block $100_B$, thereby changing that key structure 200 state from erased to active (block 278). For example, the encryption application writes the seventh encryption key to field $204_1$ of key structure $200_M$ that is within location $102_{1B}$. Metadata associated with the seventh active encryption key may be stored to field $202_3$ of key structure $200_M$ and error control data that protects the seventh active encryption key and metadata in field $202_2$ (if any) may be written to field $206_2$ of key structure $200_M$.

Method 250 may continue with copying the key structures 200 within key block $100_A$ that are in the active state (block 280) and writing those key structures 200 to key block $100_B$ (block 282). For example, the encryption application determines that key structure $200_1$, $200_3$, and $200_N$ are the only encryption key structures 200 in key block $100_A$ currently in the active state, copies key structures $200_1$, $200_3$, and $200_N$ from their respective locations $102_{1A}$, $102_{3A}$, and $102_{NA}$ in key block $100_A$, and writes the key structures $200_1$, $200_3$, and $200_N$ to locations $102_{2B}$, $102_{3B}$, and $102_{4B}$ in key block $100_B$.

Method 250 may continue with setting each key structure $200_1$, $200_2$, $200_3$, $200_4$, and $200_N$ in key block $100_A$ to the erased state (block 284). Method 250 may end at block 286.

Figure 6:
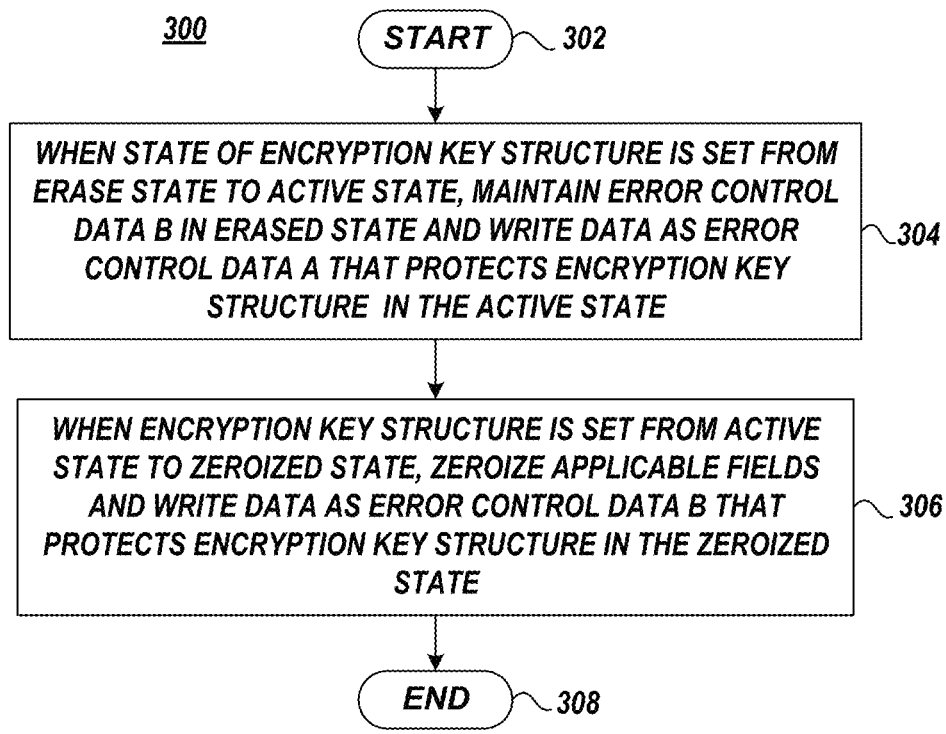
FIG. 6 illustrates an exemplary method of managing contents of an encryption key structure upon a change in state, according to various embodiments of the invention.

FIG. 6 illustrates an exemplary method 300 of managing contents of an encryption key structure 200 upon a change in state, according to various embodiments of the invention. The functionality of method 300 may be embodied by program instructions that may be evoked by the processor to cause the processor to carry out such functionality. Method 300 begins at block 302 and may continue when the state of key structure 200 is changed from erased state to active state (i.e. an active encryption key is written to field 204) with maintaining writing error control data as it existed in the erased state within field 208 and writing error control data to field 206 that protects the data within key structure 200 in the active state (block 304). For example, error control data is written to field 206 that protects the metadata within field 202, the encryption key within field 204, and the maintained "1" bits within field 208.

Method 300 may continue when the state of key structure 200 is changed from active state to zeroized state (i.e. an active encryption key is zeroized within field 204) with zeroizing applicable fields and writing error control data to field 208 that protects the data within key structure 200 in the zeroized state (block 306). For example, error control data is written to field 208 that protects zeroized metadata (one or more metadata "1" bits are set to "0") within field 202, new metadata written to field 203, zeroized encryption key (all encryption key "1" bits are set to "0") within field 204, and zeroized error control data (one or more error control data "1" bits are set to "0") within field 206. Method 300 ends at block 308.

Figure 7:
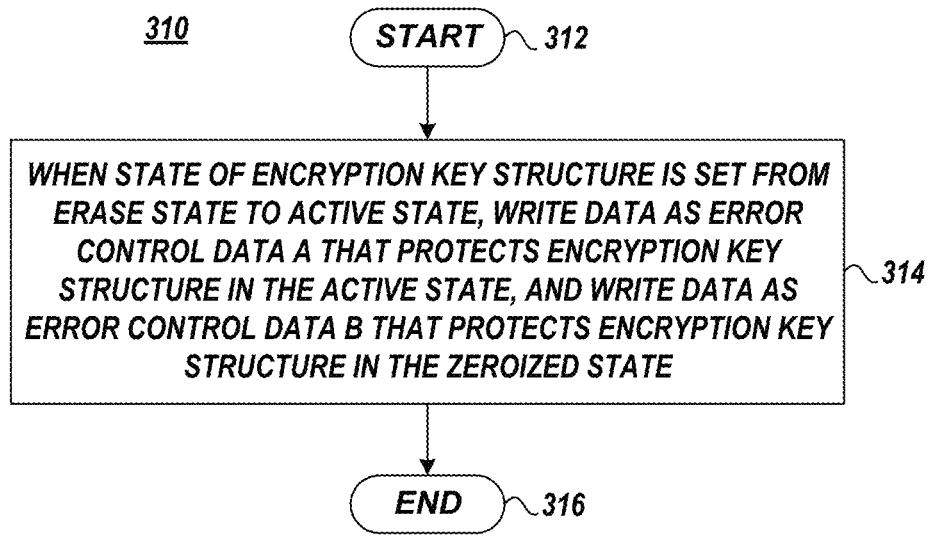
FIG. 7 illustrates an exemplary method of managing contents of an encryption key structure upon a change in state, according to various embodiments of the invention.

FIG. 7 illustrates an exemplary method 310 of managing contents of an encryption key structure 200 upon a change in state, according to various embodiments of the invention. The functionality of method 310 may be embodied by program instructions that may be evoked by the processor to cause the processor to carry out such functionality. Method 310 begins at block 312 and may continue when the state of key structure 200 is changed from erased state to active state (i.e. an active encryption key is written to field 204) with writing error control data to field 206 that protects the data within key structure 200 in the active state and writing error control data to field 208 that protects the data within key structure 200 in the zeroized state (block 314). Such method 310 assumes that the value of data within the key structure 200 as it such data exists in the erased state is known prior to key structure 200 changing from the erased state to the active state.

For example, when the state of key structure 200 is changed from erased state to active state, error control data is written to field 206 that protects the metadata within field 202 and the encryption key within field 204. In addition, when the state of key structure 200 is changed from erased state to active state, error control data is written to field 208 that protects zeroized metadata within field 202, new metadata written to field 203, zeroized encryption key (all encryption key "1" bits are set to "0") within field 204, and zeroized error control data (one or more error control data "1" bits are set to "0") within field 206. Method 310 ends at block 316.

Figure 8:
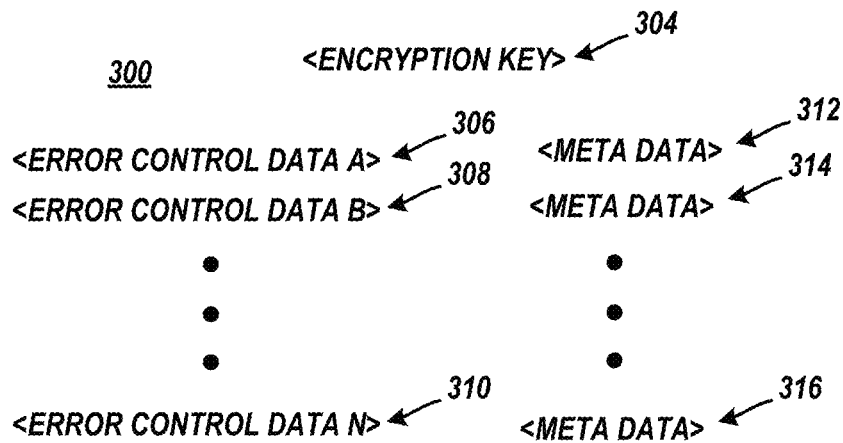
FIG. 8 illustrates an exemplary encryption key structure, according to various embodiments of the invention.

FIG. 8 illustrates an exemplary encryption key structure 300, according to various embodiments of the invention. Encryption key structure 300 is an exemplary data structure that may take on more than three valid states without moving the encryption key structure 300 from its associated key structure location 102. Encryption key structures 300 increase utilization of encryption key block 100 within block-based storage 30. In write limited storage 30, encryption key block 100 may be utilized until an unacceptably high error rate is reached.

Encryption key structure 300 includes an encryption key field 304 that is configured to contain an encryption key and includes multiple error control fields 306, 308, and 310 that are configured to contain error control data that protects the data within the encryption key structure at different or subsequent states. In some embodiments, encryption key structure 300 may also contain metadata fields 312, 314, and 316 that are configured to contain metadata.

For example, encryption key structure 300 includes metadata field 312 that is configured to contain metadata associated with the active encryption key within encryption key field 304 that is written to encryption key structure 300 when encryption key structure 300 is transitioned from the erased state to the active state. In other words, metadata field 312 may contain metadata associated with the encryption key at the instance the encryption key was created and stored to structure 300.

Encryption key structure 300 includes metadata field 314 that is configured to contain metadata associated with the active encryption key within encryption key field 304 when encryption key structure 300 is transitioned from the active state to the post-active state. In other words, metadata field 314 may contain metadata associated with data of structure 300 sequentially between the active state and the zeroized state.

Encryption key structure 300 includes metadata field 316 that is configured to contain metadata associated with the zeroized encryption key within encryption key field 304 that is written to encryption key structure 300 when encryption key structure 300 is transitioned to the zeroized state. In other words, metadata field 314 may contain metadata associated with the encryption key at the instance the encryption key was zeroized within structure 300.

Post-active state sequentially follows active state but occurs prior to zeroized state (e.g. structure 300 contains all the zeroed bits of structure 300 when in the active state plus additional zeroed bits in the post-active state). For clarity, encryption key structure 300 is depicted as having N states wherein each subsequent state after active state an additional one or more encryption key structure 300 "1" bits are set to "0" and error control data is added to the structure that protects all of the data of the encryption key structure 300 as it exists in that state.

Further, encryption key encryption key structure 300 includes an encryption key field 304 that is configured to contain an active encryption key when encryption key structure 300 is in the active state and a zeroized encryption key when encryption key structure 300 is in the zeroized state.

Encryption key structure 300 also includes error control A field 306 that is configured to contain error control data that protects data within the encryption key structure 300 in a particular state. Encryption key structure 300 also includes error control B field 308 that is configured to contain error control data that protects data within the encryption key structure 300 in a different state. Encryption key structure 300 also includes error control N field 316 that is configured to contain error control data that protects data within the encryption key structure 300 in yet another different state. For example, data in error control data A filed 306 protects encryption key structure 300 in the active state, data in error control data A filed 308 protects encryption key structure 300 in the post-active state, and data in error control data A filed 310 protects encryption key structure 300 in the zeroized state.

Figure 9:
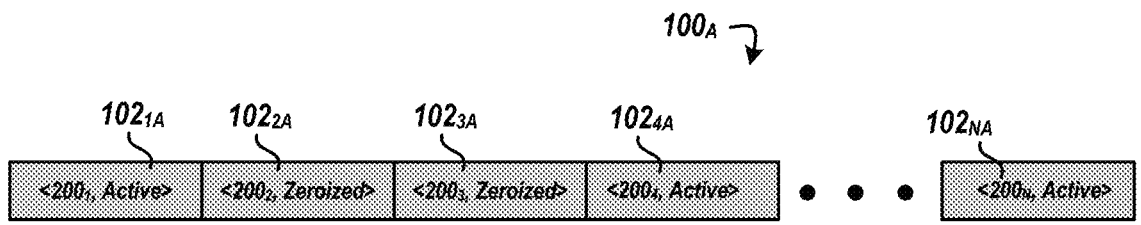
FIG. 9 illustrates an exemplary first encryption key block that includes key structure locations that each store an encryption key structure, according to various embodiments of the invention.

FIG. 9 illustrates an exemplary first encryption key block $100_A$ that includes key structure locations $102_{1A}$, $102_{2A}$, $102_{3A}$, $102_{4A}$, and $102_{NA}$ that each store an encryption key structure 200, according to various embodiments of the invention. Encryption key block $100_A$ is depicted as full in that each location $102_{1A}$, $102_{2A}$, $102_{3A}$, $102_{4A}$, and $102_{NA}$ contains a structure 200 that is not in the erased state. For example, $102_{1A}$ contains key structure $200_1$ which is in the active state, $102_{2A}$ contains key structure $200_2$ which is in the zeroized state, $102_{3A}$ contains key structure $200_3$ which is in the zeroized state, $102_{4A}$ contains key structure $200_4$ which is in the active state, and $102_{NA}$ contains key structure $200_N$ which is in the active state.

Figure 10:
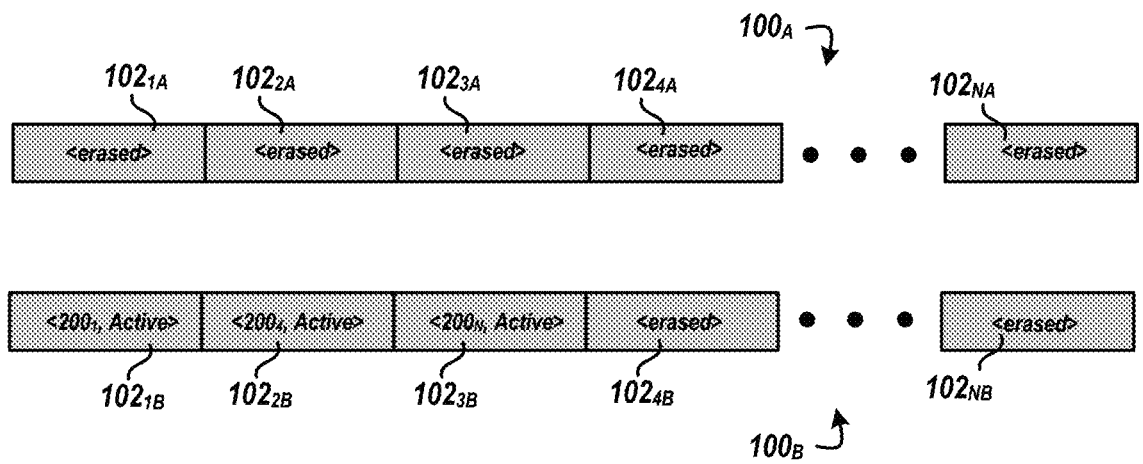
FIG. 10 illustrates a second encryption key block that includes key structure locations that may each store an active encryption key structure that is first stored in the first encryption key block, according to various embodiments of the invention.

FIG. 10 illustrates a second encryption key block $100_B$ that includes key structure locations $102_{1B}$, $102_{2B}$, $102_{3B}$, $102_{4B}$, and $102_{NB}$ that may each store an encryption key structure that was first stored in the first encryption key block and subsequently created encryption key structures, according to various embodiments of the invention.

For example, an encryption application may determine if each key structure 200 within structure locations $102_{1A}$, $102_{2A}$, $102_{3A}$, $102_{4A}$, and $102_{NA}$, respectively are no longer in the erased state. If all the key structures 200 within structure locations $102_{1A}$, $102_{2A}$, $102_{3A}$, $102_{4A}$, and $102_{NA}$ are no longer in the erased state, the encryption key block $100_A$ is full. The existing encryption keys in the active state (i.e. $200_1$, $200_4$, and $200_N$) are copied from block $100_A$ and written to a location 102 in the erased state within key block $100_B$, thereby changing that key structure 200 state from erased to active. After the active encryption keys are stored within block $100_B$, each key structure 200 in key block $100_A$ is set to the erased state.

FIG. 11 is a table that illustrates various contents and functions of data within encryption key structure, according to various embodiments of the invention.

In the erased state, encryption key structure 200 are all ones. As such, data within metadata fields 202, 203 are ones, data within field 204 are ones, data within field 206 are ones, and data within field 208 are ones.

In a first option, encryption key structure 200 is in the Active State. Data within metadata fields 202 and/or 203 is metadata associated with other fields within structure 200. Data within field 204 is an active encryption key. Data within field 206 was calculated to protect the metadata and the active encryption key. Data within field 208 are ones.

In a second option, encryption key structure 200 is in the Active State. Data within metadata fields 202 and/or 203 is metadata associated with other fields within structure 200. Data within field 204 is an active encryption key. Data within field 206 was calculated to protect the metadata, the active encryption key, and the data within field 208. Data within field 208 are ones.

In a third option, encryption key structure 200 is in the Active State. Data within metadata fields 202 and/or 203 is metadata associated with other fields within structure 200. Data within field 204 is an active encryption key. Data within field 206 are all ones. Data within field 208 was calculated to protect the metadata and the active encryption key.

In a fourth option, encryption key structure 200 is in the Active State. Data within metadata fields 202 and/or 203 is metadata associated with other fields within structure 200. Data within field 204 is an active encryption key. Data within field 206 are all ones. Data within field 208 was calculated to protect the metadata, the active encryption key, and the data within field 206.

In a fifth option, encryption key structure 200 is in the Active State. Data within metadata fields 202 and/or 203 is metadata associated with other fields within structure 200. Data within field 204 is an active encryption key. Data within field 206 was calculated to protect the metadata and the active encryption key. Data within field 208 was calculated to protect the data in fields 202, 203 and the the data in field 204 as such data is anticipated to exist the Zeroized State.

In a sixth option, encryption key structure 200 is in the Active State. Data within metadata fields 202 and/or 203 is metadata associated with other fields within structure 200. Data within field 204 is an active encryption key. Data within field 206 was calculated to protect the metadata, the active encryption key, and data within field 208. Data within field 208 was calculated to protect the data in fields 202, 203, the data in field 204, and the data in field 206 as such data is anticipated to exist the Zeroized State.

In a seventh option, encryption key structure 200 is in the Active State. Data within metadata fields 202 and/or 203 is metadata associated with other fields within structure 200. Data within field 204 is an active encryption key. Data within field 206 was calculated to protect the data in fields 202, 203 and the data in field 204 as such data is anticipated to exist the Zeroized State. Data within field 208 was calculated to protect the metadata and the active encryption key.

In an eighth option, encryption key structure 200 is in the Active State. Data within metadata fields 202 and/or 203 is metadata associated with other fields within structure 200. Data within field 204 is an active encryption key. Data within field 206 was calculated to protect the data in fields 202, 203, the data in field 204, and the data in field 208 as such data is anticipated to exist the Zeroized State. Data within field 208 was calculated to protect the metadata, the active encryption key, and data within field 206.

In a ninth option, encryption key structure 200 in the Zeroized State. Data within metadata fields 202 and/or 203 is zeroized metadata. Data within field 204 is a zeroized encryption key. Data within field 206 is optionally zeroized. Data within field 208 was calculated to protect the zeroized metadata and the zeroized encryption key.

In a tenth option, encryption key structure 200 is in the Zeroized State. Data within metadata fields 202 and/or 203 is zeroized metadata. Data within field 204 is a zeroized encryption key. Data within field 206 is optionally zeroized. Data within field 208 was calculated to protect the zeroized metadata, the zeroized encryption key, and the data within field 206.

In an eleventh option, encryption key structure 200 in the Zeroized State. Data within metadata fields 202 and/or 203 is zeroized metadata. Data within field 204 is a zeroized encryption key. Data within field 206 was calculated to protect the zeroized metadata and the zeroized encryption key. Data within field 208 is optionally zeroized.

In a twelfth option, encryption key structure 200 is in the Zeroized State. Data within metadata fields 202 and/or 203 is zeroized metadata. Data within field 204 is a zeroized encryption key. Data within field 206 was calculated to protect the zeroized metadata, the zeroized encryption key, and the data within field 208. Data within field 208 is optionally zeroized.

Various advantages of the embodiments are disclosed herein. In an example, wherein the size of block $100_A$ is 64 KB, and the average size of key structure 200 is 64 bytes, then on average, there is room to store 1024 key structures 200 in block $100_A$. If in a given use case there might be a maximum 256 encryption keys in use at any one time, then 768 key structures 200 could be stored in block $100_A$. In the case where the 256 keys were created before any rekey is performed, the embodiments described herein teach schemes for up to 768 rekey operations to be performed within the block $100_A$ without need for any erase operations. If two such blocks $100_A$ and $100_B$ were used in ping-pong fashion, and each could support up to two thousand erase operations before the error rate became unacceptable, then around four million rekeys could be performed.

A problem with some key structures is when they have a single ECC field. The single ECC field is acceptable if there is the key structure takes one state that had to be protected but may be unacceptable when there are more than one such states, such as active and zeroized, that are to be each protected. In such key structures, because the ECC field itself cannot be updated or modified, without an intervening erase operation, to reflect the modified values. By implementing error control field 208, error control data, such as ECC, that protects the key structure as it has been modified to transition from the active state to the zeroized state does not in an of itself triggering an erase operation.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A computer program product for changing a state of a first encryption key structure within a first location of a block-based storage, the computer program product comprising a computer readable storage medium having program instructions embodied therewith, wherein the program instructions are readable to cause a processor to:
   change the state of the first encryption key structure from an erased state to an active state by at least storing a first active encryption key within an encryption key field of the encryption key structure and storing first error correction code that protects at least the first active encryption key within a first control data field of the encryption key structure; and
   change the state of the first encryption key structure from the active state to a zeroized state by at least setting a majority of non-zero bits of the first active encryption key to zero within the encryption key field to create a zeroized encryption key, by setting zero or more non-zero bits of the first error correction code to zero within the first control data field to create zeroized first error correction code, and by storing second error correction code that protects at least the zeroized encryption key within a second control data field of the first encryption key structure.

2. The computer program product of claim 1, wherein storing the first active encryption key within an encryption key field of the first encryption key structure comprises:
   setting selective bits within the encryption key field to zero from a previous one such that the encryption key field comprise bits set to zero and bits set to one.

3. The computer program product of claim 1, wherein the program instructions that change the state of the first encryption key structure from the erased state to the active state further cause the processor to:
   store first metadata associated with the first active encryption key within a first metadata field of the first encryption key structure; and
   wherein the first error correction code further protects the first metadata.

4. The computer program product of claim 3, wherein the program instructions that change the state of the first encryption key structure from the active state to the zeroized state further cause the processor to:
   set zero or more non-zero bits of the first metadata to zero to create zeroized first metadata and store second metadata associated with the zeroized first encryption key within a second metadata field of the encryption key structure; and
   wherein the second error correction code further protects the zeroized first metadata and the second metadata.

5. The computer program product of claim 4, wherein the second metadata comprises a pointer to a second location of the block-based storage, the second location of the block-based storage comprising a second encryption key structure that comprises a second active encryption key that is associated with rekeying the first active encryption key.

6. The computer program product of claim 5, wherein the program instructions are readable to further cause the processor to:
   change the state of the first encryption key structure from the zeroized state to the erased state by setting at least nominally all bits of the first encryption key structure to one upon determining the second encryption key structure is in an active state.

7. The computer program product of claim 1, wherein the block-based storage is a non-volatile block-based storage device.

8. A data handling system comprising a processor communicatively connected to a memory that comprises program instructions that are readable by the processor to cause the processor to:
   change the state of the first encryption key structure from an erased state to an active state by at least storing a first active encryption key within an encryption key field of the encryption key structure and storing first error correction code that protects at least the first active encryption key within a first control data field of the encryption key structure; and
   change the state of the first encryption key structure from the active state to a zeroized state by at least setting a majority of non-zero bits of the first active encryption key to zero within the encryption key field to create a zeroized encryption key, by setting zero or more non-zero bits of the first error correction code to zero within the first control data field to create zeroized first error correction code, and by storing second error correction code that protects at least the zeroized encryption key within a second control data field of the first encryption key structure.

9. The data handling system of claim 8, wherein storing the first active encryption key within an encryption key field of the first encryption key structure comprises:
   setting selective bits within the encryption key field to zero from a previous one such that the encryption key field comprise bits set to zero and bits set to one.

10. The data handling system of claim 8, wherein the program instructions that change the state of the first encryption key structure from the erased state to the active state further cause the processor to:
    store first metadata associated with the first active encryption key within a first metadata field of the first encryption key structure; and
    wherein the first error correction code further protects the first metadata.

11. The data handling system of claim 10, wherein the program instructions that change the state of the first encryption key structure from the active state to the zeroized state, further cause the processor to:
    set zero or more non-zero bits of the first metadata to zero to create zeroized first metadata and store second metadata associated with the zeroized first encryption key within a second metadata field of the encryption key structure; and wherein the second error correction code further protects the zeroized first metadata and the second metadata.

12. The data handling system of claim 11, wherein the second metadata comprises a pointer to a second location of the block-based storage, the second location of the block-based storage comprising a second encryption key structure that comprises a second active encryption key that is associated with rekeying the first active encryption key.

13. The data handling system of claim 12, wherein the program instructions are readable to further cause the processor to:

change the state of the first encryption key structure from the zeroized state to the erased state by setting at least nominally all bits of the first encryption key structure to one upon determining the second encryption key structure is in an active state.

14. The data handling system of claim 13, wherein the block-based storage is a non-volatile block-based storage device.

15. A computer program product for managing a state of a first encryption key structure within a first location of a block-based storage, the computer program product comprising a computer readable storage medium having program instructions embodied therewith, wherein the program instructions are readable to cause a processor to:

store a first active encryption key within an encryption key field of the encryption key structure;

store first error correction code that protects the first active encryption key within a first control data field of the encryption key structure;

determine which one or more non-zero bits of the first error correction code are set to zero, thereby forming zeroized first error correction code, upon a state of the encryption key structure changing from an active state to a zeroized state; and prior to the state of the encryption key structure changing from the active state to the zeroized state, store second error correction code that protects a zeroized encryption key and protects the zeroized first error correction code within a second control data field of the first encryption key structure.

16. The computer program product of claim 15, wherein the zeroized encryption key is formed by setting at least a majority non-zero bits of the first active encryption key to zero.

17. The computer program product of claim 15, wherein the program instructions are readable to further cause the processor to:

store first metadata associated with the first active encryption key within a first metadata field of the first encryption key structure; and wherein the first error correction code further protects the first metadata.

18. The computer program product of claim 17, wherein the program instructions are readable to further cause the processor to:

determine which one or more non-zero bits of the first metadata are set to zero, thereby forming zeroized first metadata, upon a state of the encryption key structure changing from an active state to a zeroized state; and wherein the second error correction code further protects the zeroized first metadata.

19. The computer program product of claim 18, wherein the program instructions are readable to further cause the processor to:

set at least nominally all zero bits of the first encryption key structure to one.

20. The computer program product of claim 19, wherein the block-based storage is a non-volatile block-based storage device.

* * * * *